March 31, 1953
L. R. MOORE ET AL
2,633,272
FEEDING AND MEASURING DEVICE
Filed June 24, 1949
2 SHEETS—SHEET 1
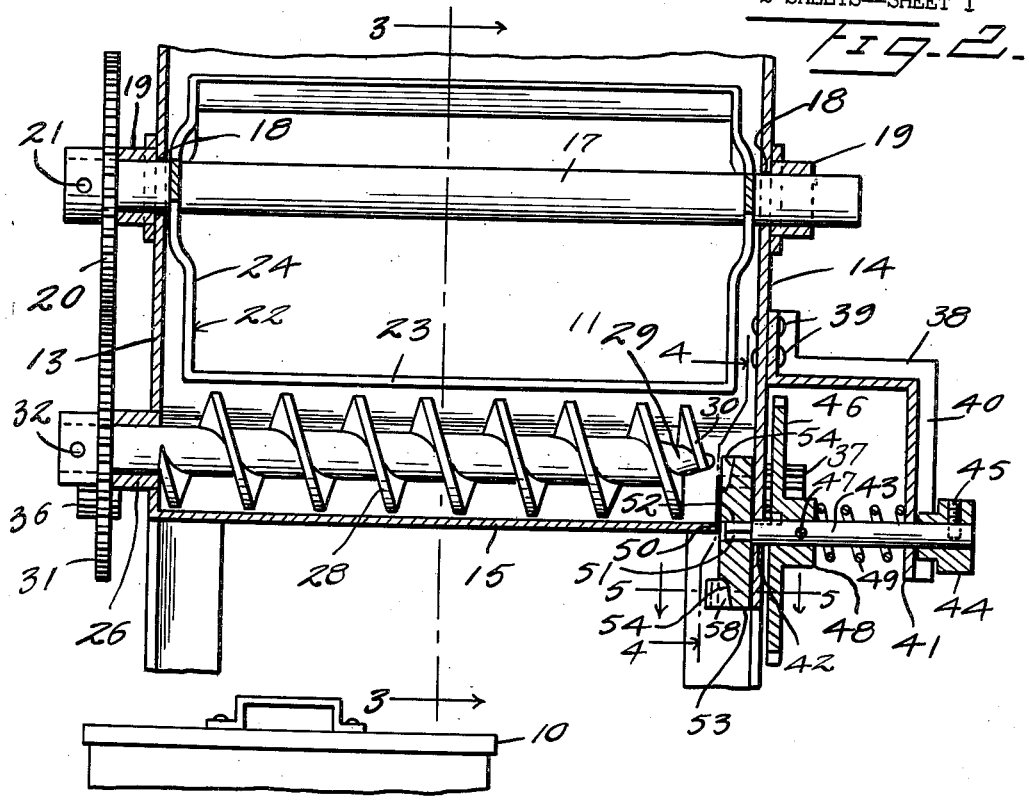
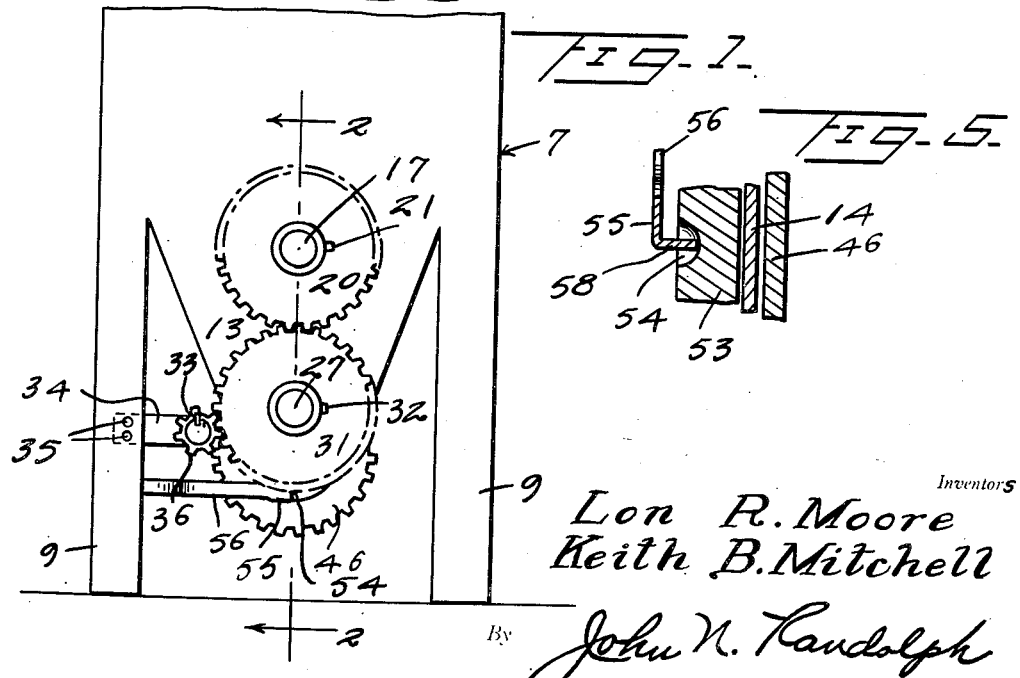
Inventors
Lon R. Moore
Keith B. Mitchell
By John N. Randolph
Attorney

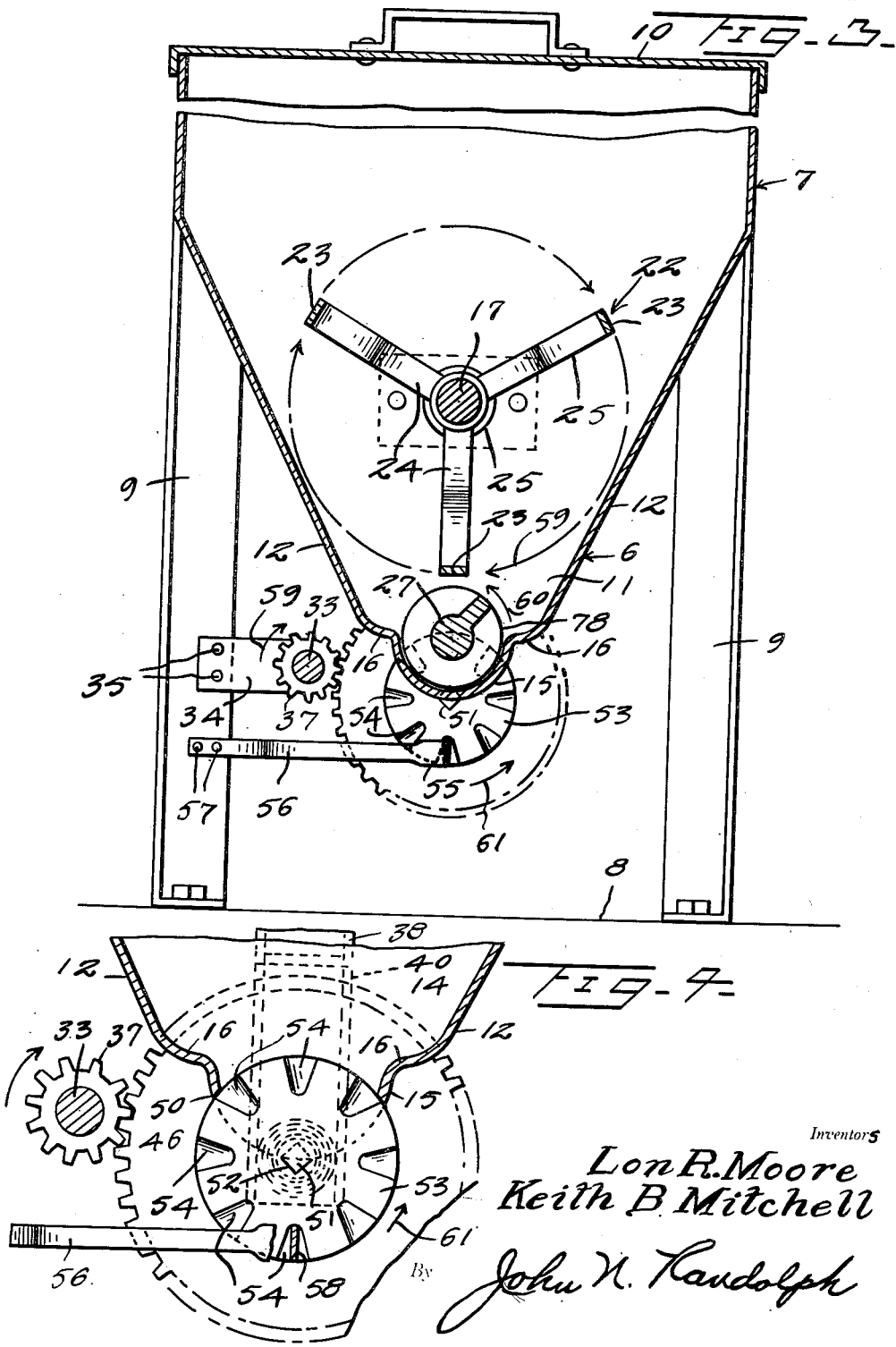

Patented Mar. 31, 1953

2,633,272

UNITED STATES PATENT OFFICE 2,633,272

FEEDING AND MEASURING DEVICE

Lon R. Moore and Keith B. Mitchell, Wichita, Kans., assignors to Forster Chemical Co., Inc., a corporation of Kansas Application June 24, 1949, Serial No. 101,152

5 Claims. (Cl. 222—238)

This invention relates to a dispensing apparatus for feeding and dispensing measured quantities of a dry powdered or finely divided material and which is particularly adapted for use in dispensing chemicals and powdered substances in accurate measured amounts to flour mills, including such substances as flour, bleaching powder, flour enrichment or other chemical treatments in a powdered form; however, it being understood that the machine is likewise intended for and well adapted for use in dispensing measured quantities of other finely divided materials for other purposes.

In the processing of flour or the manufacture thereof, dry chemicals or other dry substances are required which must be accurately measured to an ounce or fraction thereof per barrel of flour and it is accordingly a primary object of the present invention to provide a dispensing or feeding device capable of effectively accomplishing this result and through the use of which the operation of manufacturing, treating or processing flour in flour mills may be more efficiently and rapidly accomplished through the automatic measuring means afforded by the present invention, than is possible by conventional methods now employed.

More particularly, it is an aim of the present invention to provide a measuring and dispensing apparatus of extremely simple construction which may be economically manufactured and which will be extremely efficient and durable for accomplishing its intended purpose.

Another object of the invention is to provide a dispensing and measuring apparatus having means whereby the measuring element thereof may be readily removed and replaced to enable different quantities of a material to be dispensed within a given period of time and without varying the speed of operation of the machine.

Numerous other objects and advantages of the invention will hereinafter become more fully apparent from the following description of the drawings, illustrating a presently preferred embodiment thereof, and wherein:

Figure 1 is a fragmentary end elevational view of the measuring and dispensing apparatus or machine;

Figure 2 is an enlarged longitudinal vertical sectional view thereof taken substantially along a plane as indicated by the line 2—2 of Figure 1;

Figure 3 is an enlarged cross sectional view of the machine taken substantially along a plane as indicated by the line 3—3 of Figure 2;

Figure 4 is an enlarged cross sectional view of a portion of the machine including the measuring unit taken substantially along a plane as indicated by the line 4—4 of Figure 2, and Figure 5 is an enlarged fragmentary horizontal sectional view taken substantially along a plane as indicated by the line 5—5 of Figure 2.

Referring more specifically to the drawings, the novel dispensing and measuring machine or apparatus in its entirety is designated generally 6 and includes a relatively large hopper or container 7 which is adapted to be supported in an elevated position with respect to a supporting surface 8 by a plurality, preferably four, depending legs 9 which are fixed to or formed integral with the hopper 7 and which depend therefrom above the bottom thereof. The hopper 7 may be of any desired size or shape and is preferably open at its top to enable the hopper or container to be readily filled with a finely divided or powdered substance, not shown, and said open top thereof is normally closed by a flanged lid or cover 10. The container or hopper 7 is provided with a substantially trough shaped bottom 11 which is disposed between the legs 9 and which is formed by corresponding downwardly converging side walls 12 and corresponding substantially parallel end wall portions 13 and 14 of the hopper 7. Said trough 11 is provided with a bottom including a longitudinally extending trough shaped intermediate portion 15 which extends between the end walls 13 and 14 and which is of substantially semicircular cross section, as seen in Figure 3. The trough shaped bottom portion 15 has outwardly flared side edge portions 16 which form integral continuations of the converging side wall portions 12.

A shaft 17 extends longitudinally and centrally through the trough 11, substantially intermediate of its top and bottom and outwardly through openings 18 in the end walls 13 and 14. The shaft 17 is journaled in corresponding aligned bearings 19 which are suitably secured to the outer sides of the end walls 13 and 14 and one end of said shaft 17, which is disposed externally of and adjacent the wall 13 has a gear 20 detachably fixed thereto by a fastening 21. The shaft 17 supports an agitator, designated generally 22, for rotation therewith within the trough 11, said agitator 22 including a plurality of circumferentially spaced blades or agitator elements 23 which are disposed within the trough and extend longitudinally thereof and which are provided with inturned end portions forming radially extending spokes 24 which are connected by hubs 25 to the shaft 17 for rotation therewith. The agitator 22 is of a diameter, as illustrated in Figure 3, to just clear the walls 12 when rotated with the shaft 17.

The lower portion of the wall 13 is provided with an external bearing 26 for journaling a portion of a shaft 27 one end of which extends longitudinally through the bottom portion of the trough 11 to adjacent the opposite end wall 14. Said shaft portion is provided with a screw conveyor 28 and has a tapered inner end 29 disposed contiguous with a tapered end 30 of the thread of the screw conveyor 28. The shaft 27 is disposed substantially axially of the bottom portion 15 and the convolutions of the screw conveyor, except the tapered end convolutions thereof, substantially contact the inner surface of said bottom portion 15 and have their peripheries disposed substantially concentric therewith, as seen in Figure 3. The opposite end of the shaft 27 projects outwardly from the bearing 26 and has a gear 31 secured thereto by a fastening 32 and which gear meshes with the gear 20.

A shaft 33 is disposed externally of and to one side of the trough bottom 15 and substantially parallel to the shaft 27 and is journaled in bearings 34 which are secured, as by fastenings 35, to two of the legs 9 and which extend inwardly and toward the trough therefrom. A pinion 36 is keyed to the shaft 33 near one end thereof and meshes with the gear 31 and a pinion 37 is fixed to the shaft 33 adjacent its opposite end, for a purpose which will hereinafter be described.

A bracket 38 is connected by a fastening 39 to the outer side of the end wall 14 and is provided with an outwardly offset depending hanger portion 40 of channel shaped cross section and which is disposed to open outwardly. The intermediate portion of the hanger 40, near its lower end, is provided with an opening 41 which aligns with an opening 42 formed in the end wall 14, said openings providing journals for a shaft 43 which is rotatably and reciprocally disposed therein. A flanged collar 44 is detachably secured to the outer end of the shaft 43 by a screw fastening 45 and is adapted to partially seat in the channel portion of the hanger 40 to provide a stop for limiting the movement of the shaft 43 toward and through the end wall 14. A gear 46 is detachably and adjustably secured to the shaft 43 by a fastening 47 which extends through a hub portion 48 thereof and engages the shaft 43, to locate said gear outwardly of and adjacent the end wall 14. The gear 46 meshes with the pinion 37. An expansion coiled spring 49 is disposed loosely around the shaft 43 and bears with one end against the hanger 40 and with its opposite end against the hub 48 for urging said shaft 43 inwardly, as seen in Figure 2.

The trough bottom portion 15 is provided with an arcuate, circumferentially extending opening 50 adjacent the end wall 14 and into the bottom portion of which the opposite end 51 of the shaft 43 extends. Said shaft end 51 is non-circular in cross section, as seen in Figures 2, 3 and 4 to detachably engage in a similarly shaped opening 52 which is centrally formed in a dispensing rotor or disk 53 for keying said rotor or disk to the shaft 43. Said shaft portion 51 is also slightly reduced so that the spring 49 will tend to exert a thrust against the rotor 53. The rotor 53 is of a thickness only slightly less than the width of the opening 50 and is disposed to fit rotatably but relatively snug therein, as best illustrated in Figure 4, and with approximately the upper third of said rotor or disk disposed within the trough bottom 15. The inner side or side of the rotor remote to the gear 46 is provided with circumferentially spaced corresponding recesses or pockets 54 which are flared toward and open outwardly of the periphery thereof. Each of the pockets 54 is of arcuate cross section and has concavely rounded outwardly flared sides, as seen in Figure 5.

A blade 55 is provided with an elongated, resilient supporting arm 56 which is secured by fastenings 57 to one of the legs 9 at the end thereof remote to the blade 55 and said blade is disposed at the inner side of and adjacent the bottom of the rotor 53 and has an angularly turned scraping edge 58 which is adapted to engage each pocket or recess 54 of the rotor 53 as said pocket or recess reaches a lowermost position in its rotation, as seen in Figures 3, 4 and 5 and is spring urged into engagement with each pocket or recess for scraping the surface thereof and is cammed out of engagement therewith by the rounded side edges of said pockets.

The shafts 17, 27, 33 are adapted to be driven in unison by connection to any suitable power source, not shown, which may be connected to any one of the gears or to an end of either the shaft 17 or 33 for revolving the shafts 17 and 33 in a clockwise direction as seen in Figure 3 and as indicated by the arrows 59 and for revolving the screw conveyor shaft 27 in a counterclockwise direction as indicated by the arrow 60. The gear 46 will be driven by the pinion 37 likewise in a counterclockwise direction as indicated by the arrows 61 and which will cause the rotor 53 to likewise turn in the same direction or counterclockwise. Material to be fed and dispensed in measured quantities by the machine or apparatus 6 is loaded into the hopper or container 7 through the open top thereof with the cover 10 removed and feeds by gravity to the bottom portion 15 of the trough. The material which is in a finely divided, loose or powdered state is agitated in its downward passage through the trough 11 by the agitator blades 23 and the weight thereof causes the material, not shown, to fill the trough bottom 15 between the convolutions of the feed screw 28. Due to the direction of rotation of the feed screw 28, as indicated by the arrows 60 in Figure 3, the material is fed thereby longitudinally through the trough bottom 15 from left to right as seen in Figure 2 or toward the measuring and dispensing rotor or disk 53. The material is forced to said right-hand end of the trough bottom 15 by the conveyor 28 so that it will fill the pockets 54 of the rotor 53, which are in uppermost positions and located within the trough bottom 15 and as said rotor 53 is revolving in a counterclockwise direction, as seen in Figures 3 and 4, the pockets or recesses 54 after being filled with the material will move downwardly so that the material can be discharged therefrom by gravity into a flour mill or other receptacle or receiver, not shown, located therebeneath and after the filled pockets have passed outwardly through the trough bottom opening 50. It will thus be seen that since the rotor 53 is revolved at a predetermined speed by the gear 46, that when the shafts 17, 27 and 33 are driven at a correct predetermined speed an exact amount of the contents of the hopper 7 will be dispensed in any given period. To insure that all of the contents of each recess or pocket 54 will be dispensed therefrom the scraper edge 58, as previously described, scrapes each pocket or recess 54 as it reaches a lowermost position for removing any of the material which may not have fallen therefrom by gravity to thereby insure an accurate measurement of the material dispensed. Furthermore, it will be readily apparent that the screw conveyor 28 will maintain the material under pressure against the upper part of the rotor 53 to insure filling of each pocket 54 as it moves through the trough bottom 15. As previously stated the rotor 53 is sized so that its upper portion will substantially fill the opening 50, as illustrated in Figure 4, and is held against the inner wall of said opening by the spring 49 to prevent escape of the material through the opening 50 except while contained in one of the pockets or recesses 54.

In order that the rate at which the material can be dispensed by the apparatus 6 may be varied without varying the speed of operation of the device, the shaft 43 is slidably mounted so that the collar 44 can be manually engaged for retracting the shaft 43 from left to right of Figure 2 and against the action of the spring 49 to disengage its non-circular end 51 from the rotor opening 52 so that the rotor may be readily removed and replaced by another rotor or disk having recesses or pockets which are either larger or smaller than those as illustrated, after which the shaft 43 can be released to permit the spring 49 to project it from right to left for engaging its non-circular end 51 in the correspondingly shaped opening of the other rotor. Accordingly, the machine will then dispense a greater or lesser amount of the material depending upon whether the pockets or recesses 54 of the new rotor are larger or smaller, respectively, than the pockets 54 as illustrated.

Various modifications and changes are contemplated and may obviously be resorted to, without departing from the spirit or scope of the invention as hereinafter defined by the appended claims.

We claim as our invention:

1. A machine or apparatus for feeding and dispensing measured quantities of a finely divided or powdered material comprising a hopper adapted to contain a finely divided or powdered material to be fed and dispensed having a substantially trough shaped bottom portion to which the material is adapted to be fed by gravity, a driven shaft journaled in one end wall of said trough shaped hopper bottom and extending longitudinally thereof and to adjacent the other end of the trough bottom, a screw conveyor fixed to said shaft and disposed within the hopper bottom and having the periphery of its convolutions disposed adjacent the trough bottom for feeding the material toward the end of said shaft located in the hopper trough, said trough bottom having an arcuate opening disposed adjacent its opposite end wall and beyond said end of the shaft and which opens outwardly of the hopper, a dispensing rotor having a portion disposed in the trough bottom and extending through and substantially filling said trough bottom opening and rotatably disposed therein and having its remaining portion located beneath the trough bottom and externally of the hopper, the inner side of said rotor, located adjacent to and facing the screw conveyor, being provided with a series of circumferentially spaced recesses or pockets adapted to be filled with the material from the screw conveyor as said pockets move through the trough bottom and from which the material is adapted to be dispensed by gravity as said pockets rotate downwardly and out of the trough into exposed positions beneath the hopper, and gearing forming a driving connection between the screw conveyor shaft and said rotor for causing the rotor to be revolved simultaneously with the screw conveyor.

2. A feeding and dispensing machine as in claim 1, each of said pockets opening outwardly of the periphery of the rotor and being of arcuate cross section.

3. A feeding and dispensing machine as in claim 1, each of said pockets opening outwardly of the periphery of the rotor and having concavely rounded sides disposed in outwardly diverging relationship.

4. A feeding and dispensing machine as in claim 1, said gearing including a driven shaft reciprocally and rotatably mounted in the machine and having one end detachably keyed to the rotor, said last mentioned shaft being retractable out of engagement with the rotor for removing and replacing the rotor.

5. A feeding and dispensing machine as in claim 1, said gearing including a driven shaft reciprocally and rotatably mounted in the machine and having one end detachably keyed to the rotor, said last mentioned shaft being retractable out of engagement with the rotor for removing and replacing the rotor, and spring means supported by said last mentioned shaft and urging it in one direction for normally retaining the shaft in a projected position for holding the recessed side of the rotor against an inner edge of the trough bottom opening.

LON R. MOORE.
KEITH B. MITCHELL.

REFERENCES CITED

The following references are of record in the file of this patent:

UNITED STATES PATENTS

| Number | Name | Date |
|---|---|---|
| 186,859 | Loyd | Jan. 30, 1877 |
| 533,252 | Thomas | Jan. 29, 1895 |
| 1,463,457 | Beckmann | July 31, 1923 |
| 1,756,002 | Nagy | Apr. 22, 1930 |
| 1,851,044 | Genovesi | Mar. 29, 1932 |
| 2,181,205 | Rigor | Nov. 28, 1939 |